United States Patent
Lin (10) Patent No.: US 12,424,119 B1
(45) Date of Patent: Sep. 23, 2025

(54) DISTRACTOR GENERATION FOR MULTIPLE-CHOICE QUESTIONS

(71) Applicant: QUIZLET, INC., San Francisco, CA (US)

(72) Inventor: Tingting Lin, San Francisco, CA (US)

(73) Assignee: Quizlet, Inc., San Francisco, CA (US)

( * ) Notice: Subject to any disclaimer, the term of this patent is extended or adjusted under 35 U.S.C. 154(b) by 202 days.

(21) Appl. No.: 18/184,982

(22) Filed: Mar. 16, 2023

(51) Int. Cl.
*G09B 7/06* (2006.01)
*G06F 16/21* (2019.01)
*G06N 20/20* (2019.01)

(52) U.S. Cl.
CPC ............. *G09B 7/06* (2013.01); *G06F 16/212* (2019.01); *G06N 20/20* (2019.01)

(58) Field of Classification Search
CPC .......... G09B 7/06; G06N 20/20; G06F 16/212
See application file for complete search history.

(56) References Cited

U.S. PATENT DOCUMENTS

| | | |
|---|---|---|
| 2016/0293034 A1 | 10/2016 | Agarwalla et al. |
| 2017/0330079 A1 | 11/2017 | Akolkar et al. |
| 2017/0330087 A1 | 11/2017 | Akolkar et al. |
| 2018/0373791 A1 | 12/2018 | Yen et al. |

OTHER PUBLICATIONS

C. Liang et al., "Distractor Generation for Multiple Choice Questions Using Learning to Rank," Proceedings of the Thirteenth Workshop on Innovative Use of NLP for Building Educational Applications, ACL, pp. 284-290, New Orleans, LA, Jun. 5, 2018.

*Primary Examiner* — Timothy A Musselman
(74) *Attorney, Agent, or Firm* — Baker Botts L.L.P.

(57) ABSTRACT

In one embodiment, a computer-implemented method comprises, using an application server computer that is communicatively coupled to a database via a telecommunication network, the database comprising a digitally stored relational table schema storing a plurality of term sets, each of the term sets comprising a plurality of terms, the application server computer hosting an application program programmed with a plurality of distractor selection algorithms; executing each of the distractor algorithms to access a particular term from among the plurality of the terms as an input and to generate a plurality of corresponding first interim sets of candidate distractor terms, for the particular term, as an output; executing a first inference stage of a within-set machine learning model over the same particular term as input to generate classification output comprising a second interim set of candidate distractor terms, for the particular term; executing a second inference stage of a cross-algorithm ranking machine learning model over the plurality of corresponding first interim sets and the second interim set to generate a top-N set of best candidate distractors; digitally storing the top-N set of best candidate distractors in a table of the relational table schema in association with the particular term; formatting the top-N set of best candidate distractors with the particular term as a multiple-choice question set and transmitting, to a client computer, presentation instructions which when rendered using the client computer cause presenting a user interface comprising the particular term as a prompt and the top-N set of best candidate distractors as available answers.

18 Claims, 4 Drawing Sheets

DISTRACTOR GENERATION FOR MULTIPLE-CHOICE QUESTIONS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2022-2023 Quizlet, Inc.

TECHNICAL FIELD

One technical field of the present disclosure is computer-implemented artificial intelligence applied to online education systems, using trained machine learning models to generate answers corresponding to terms of a subject.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Traditional online learning systems have made targeted instructions for students, in a wide variety of subjects and learning modes, more accessible than ever before. Outside of traditional educational institutions, diverse groups of users spread across the globe can learn almost anything without ever setting foot in a classroom. The learning modes can be a flashcard mode, a learn and write mode, a test mode, and other modes. For example, users can apply a learn and write mode which includes a personalized study plan to study multiple choice questions (MCQs) based on their familiarity with a set's content and advance the education from easy to complex questions. As another example, users can apply a flashcard or test mode to test knowledge with flashcards and review terms and definitions of a text word in a flashcard. As a result, various learning modes collectively provide expert solutions to help users through step-by-step questions. Users can quickly understand the reasons behind the right answer during the learning process and apply the knowledge in future study.

Digital flashcards can be organized as a question with a plurality of possible answers, only one of which is correct. The form and content of the incorrect answers, sometimes termed distractors or distractor answers, have a significant influence on the value of a flashcard and its effectiveness in learning. One example approach for using machine learning to select distractors appears in C. Liang et al., "Distractor Generation for Multiple Choice Questions Using Learning to Rank," Proc. 13th Workshop on Innovative Use of NLP for Building Educational Applications (2018), pp. 284-290. However, the relevant technical field has developed a need for improved, practical approaches for automatically generating effective questions for digital flashcards using machine-implemented methods.

SUMMARY

The appended claims may serve as a summary of the invention.

DETAILED DESCRIPTION

In the following description, for the purposes of explanation, numerous specific details are set forth to provide a thorough understanding of the present invention. It will be apparent, however, that the present invention may be practiced without these specific details. In other instances, well-known structures and devices are shown in block diagram form to avoid unnecessarily obscuring the present invention.

The text of this disclosure, in combination with the drawing figures, is intended to state in prose the algorithms that are necessary to program the computer to implement the claimed inventions, at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

One or more different inventions may be described in this disclosure, with alternative embodiments to illustrate examples. Other embodiments may be utilized and structural, logical, software, electrical, and other changes may be made without departing from the scope of the embodiments that are specifically described. Various modifications and alterations are possible and expected. Some features of one or more of the inventions may be described with reference to one or more embodiments or drawing figures, but such features are not limited to usage in the one or more embodiments or figures with reference to which they are described. Thus, the present disclosure is neither a literal description of all embodiments of one or more of the inventions nor a listing of features of one or more of the inventions that must be present in all embodiments.

Headings of sections and the title are provided for convenience but are not intended as limiting the disclosure in any way or as a basis for interpreting the claims. Devices that are described as in communication with each other need not be in continuous communication with each other, unless expressly specified otherwise. In addition, devices that are in communication with each other may communicate directly or indirectly through one or more intermediaries, logical or physical.

A description of an embodiment with several components in communication with one other does not imply that all such components are required. Optional components may be described to illustrate a variety of possible embodiments and to illustrate one or more aspects of the inventions more fully. Similarly, although process steps, method steps, algorithms, or the like may be described in sequential order, such processes, methods, and algorithms may generally be configured to work in different orders, unless specifically stated to the contrary. Any sequence or order of steps described in this disclosure is not a required sequence or order. The steps of described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment, but need not occur only once. Some steps may be omitted in some embodiments or some occurrences, or some steps may be executed more than once in each embodiment or occurrence. When a single device or article is described, more than one device or article may be used in place of a single device or article. Where more than one device or article is described, a single device or article may be used in place of more than one device or article.

The functionality or features of a device may be alternatively embodied by one or more other devices that are not explicitly described as having such functionality or features. Thus, other embodiments of one or more of the inventions need not include the device itself. Techniques and mechanisms described or referenced herein will sometimes be described in singular form for clarity. However, it should be noted that embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

Embodiments are described in the sections below according to the following outline:
1. GENERAL OVERVIEW
2. STRUCTURAL AND FUNCTIONAL OVERVIEW
   2.1 DISTRIBUTED COMPUTER SYSTEM EXAMPLE
   2.2 MCQ GENERATOR SERVICE
   2.3 DISTRACTOR GENERATION SERVICE WITH WITHIN-SET GENERATOR
      2.3.1 WITHIN-SET GENERATOR
      2.3.2 CROSS-ALGORITHM RANKING MODE
   2.4 PROCEDURAL OVERVIEW
3. IMPLEMENTATION EXAMPLE—HARDWARE OVERVIEW 1. General Overview In an embodiment, a computer-implemented method can be programmed for, using an application server computer that is communicatively coupled to a database via a telecommunication network, the database comprising a digitally stored relational table schema storing a plurality of term sets, each of the term sets comprising a plurality of terms, the application server computer hosting an application program programmed with a plurality of distractor selection algorithms; executing each of the distractor algorithms to access a particular term from among the plurality of the terms as an input and to generate a plurality of corresponding first interim sets of candidate distractor terms, for the particular term, as an output; executing a first inference stage of a within-set machine learning model over the same particular term as input to generate classification output comprising a second interim set of candidate distractor terms, for the particular term; executing a second inference stage of a cross-algorithm ranking machine learning model over the plurality of corresponding first interim sets and the second interim set to generate a top-N set of best candidate distractors; digitally storing the top-N set of best candidate distractors in a table of the relational table schema in association with the particular term; formatting the top-N set of best candidate distractors with the particular term as a multiple-choice question set and transmitting, to a client computer, presentation instructions which when rendered using the client computer cause presenting a user interface comprising the particular term as a prompt and the top-N set of best candidate distractors as available answers.

Various embodiments encompass the subject matter of the following numbered clauses:

1. A computer-implemented method comprising: using an application server computer that is communicatively coupled to a database via a telecommunication network, the database comprising a digitally stored relational table schema storing a plurality of term sets, each of the term sets comprising a plurality of terms, the application server computer hosting an application program programmed with a plurality of distractor selection algorithms; using the application server computer, executing each of the distractor algorithms to access a particular term from among the plurality of the terms as an input and to generate a plurality of corresponding first interim sets of candidate distractor terms, for the particular term, as an output; using the application server computer, executing a first inference stage of a within-set machine learning model over the same particular term as input to generate classification output comprising a second interim set of candidate distractor terms, for the particular term; using the application server computer, executing a second inference stage of a cross-algorithm ranking machine learning model over the plurality of corresponding first interim sets and the second interim set to generate a top-N set of best candidate distractors; using the application server computer, digitally storing the top-N set of best candidate distractors in a table of the relational table schema in association with the particular term; using the application server computer, formatting the top-N set of best candidate distractors with the particular term as a multiple-choice question set and transmitting, to a client computer, presentation instructions which when rendered using the client computer cause presenting a user interface comprising the particular term as a prompt and the top-N set of best candidate distractors as available answers.

2. The computer-implemented method of Clause 1, further comprising, using the application server computer, repeating the steps of executing and the step of digitally storing for the plurality of terms of each of the term sets as part of an offline process.

3. The computer-implemented method of Clause 1, wherein the plurality of distractor selection algorithms comprises a user-defined algorithm, an often-confused algorithm, and a number replacement algorithm; wherein the plurality of corresponding first interim sets of candidate distractor terms comprises a first interim set of candidate distractor terms, a second interim set of candidate distractor terms, and a third interim set of candidate distractor terms; the method further comprising: processing the particular term using the user-defined algorithm to generate a first interim set of candidate distractor terms; processing the particular term using the often-confused algorithm to generate a second interim set of candidate distractor terms;

processing the particular term using the number replacement algorithm to generate a third interim set of candidate distractor terms.

4. The computer-implemented method of Clause 1, wherein the within-set machine learning model comprises a random forest model that has been trained on a first training dataset of labeled answer logging data obtained from a plurality of answer signals received at the application server computer from a plurality of client computers based on answers to prior questions.

5. The computer-implemented method of Clause 4, the first training dataset comprising a plurality of records each having columns, attributes, or features corresponding to a subject of a set and a plurality of distance values for distances between the particular term and a candidate distractor term.

6. The computer-implemented method of Clause 5, the plurality of distance values further comprising values for embedding similarity, edit distance, token similarity, part of speech match, length distance, whether contain numbers, prefix match, suffix match.

7. The computer-implemented method of Clause 1, wherein the cross-algorithm ranking machine learning model comprises a random forest model that has been trained on a second training dataset of labeled pairs of previous terms and previous distractors, the second training dataset comprising a plurality of records each having columns, attributes, or features corresponding to: a subject of a set; an identifier of an algorithm that generated the previous distractors; and a plurality of distance values for distances between the particular term and a candidate distractor term.

8. The computer-implemented method of Clause 7, the plurality of distance values further comprising values for embedding similarity, edit distance, token similarity, part of speech match, length distance, whether contain numbers, prefix match, suffix match.

9. The computer-implemented method of Clause 1, each of the term sets corresponding to an educational subject in an e-learning system, each of the terms in the plurality of terms comprising a digitally stored prompt of a multiple-choice question associated with the educational subject, each of the candidate distractors comprising available multiple-choice answers to the multiple-choice question.

2. Structural and Functional Overview 2.1 Distributed Computer System Example

Figure 1:
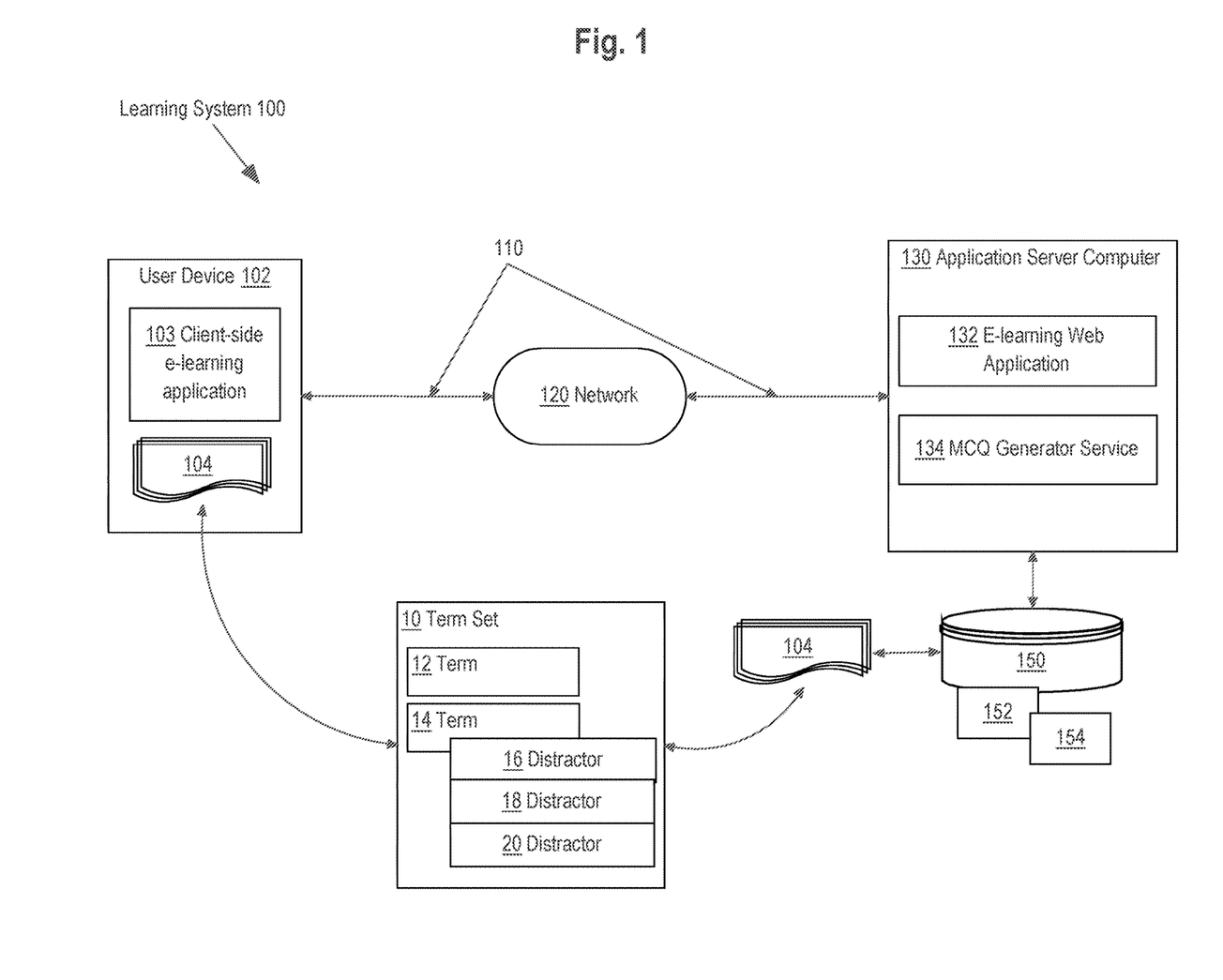
FIG. 1 illustrates a distributed computer system with which one or more embodiments can be implemented.
Figure 2:
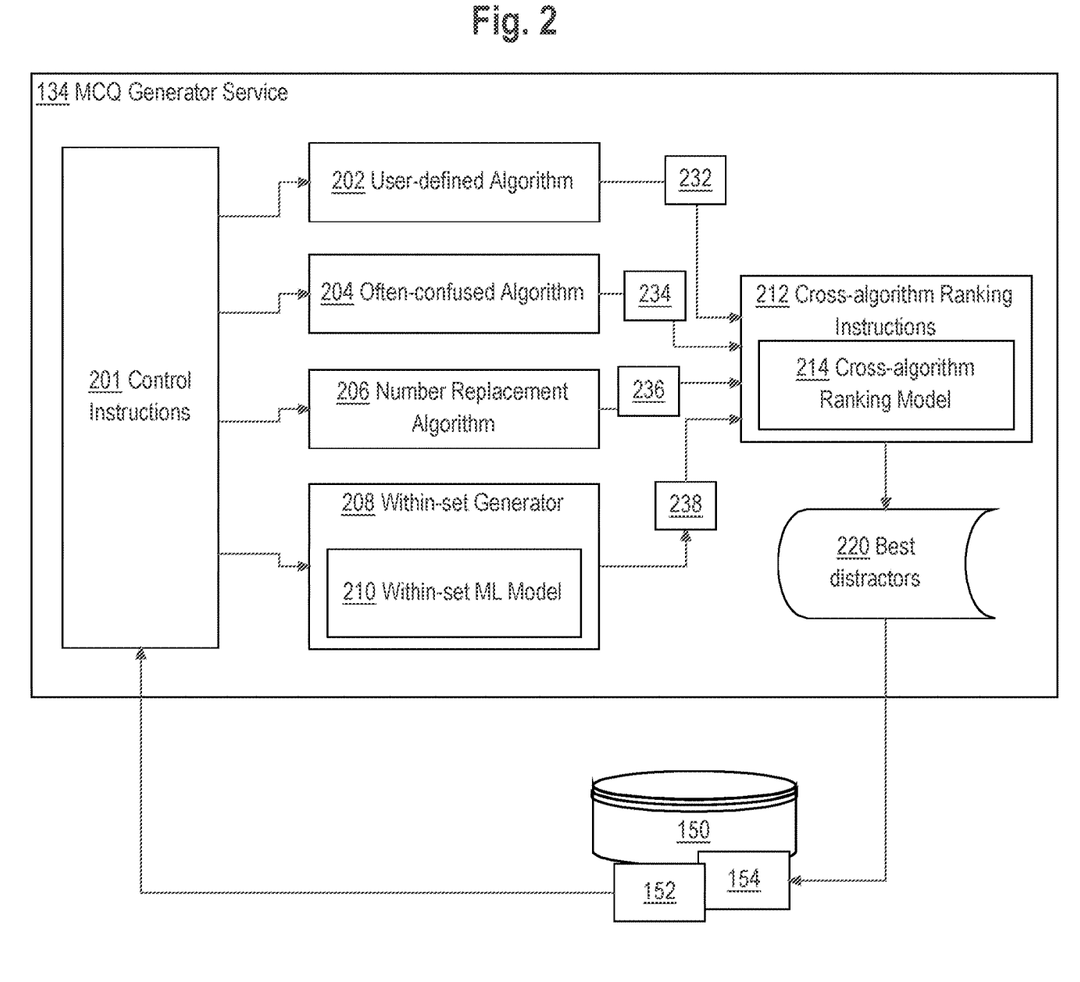
FIG. 2 illustrates an example of the structural organization of a multiple-choice question (MCQ) generator service of FIG. 1.

FIG. 1 illustrates a distributed computer system with which one or more embodiments can be implemented; FIG. 2 illustrates an example of the structural organization of a multiple-choice question (MCQ) generator service of FIG. 1. For purposes of illustrating a clear example, FIG. 1 and FIG. 2 show specific configurations of components, but other configurations may be used in other embodiments. For example, components of FIG. 1 and FIG. 2 could be combined to create a single component, or the functions of a single component could be implemented using two or more components.

Referring first to FIG. 1, in an embodiment, a distributed computer system organized as a learning system 100 is configured for automatically generating a plurality of candidate distractors for digitally stored terms that are associated with a term set. FIG. 1, the other drawing figures, and all the descriptions and claims in this disclosure, are intended to present, disclose, and claim a wholly technical system with wholly technical elements that implement technical methods. In the disclosure, specially programmed computers, using a special-purpose distributed computer system design, execute functions that have not been available before in a new manner using instructions ordered in a new way, to provide a practical application of computing technology to the technical problem of identifying one or more images which are semantically like the text information of an input question. Every step or operation that is functionally described in the disclosure is intended for implementation using programmed instructions that are executed by a computer. In this manner, the disclosure presents a technical solution to a technical problem, and any interpretation of the disclosure or claims to cover any judicial exception to patent eligibility, such as an abstract idea, mental process, method of organizing human activity, or mathematical algorithm, has no support in this disclosure and is erroneous.

Certain embodiments are described in the context of online, real-time response, automated e-learning systems. However, other embodiments can be used in domains other than education to generate candidate responses to prompts, questions, or statements of a variety of types, and the scope of the disclosure is not limited to e-learning or education.

In one embodiment, the learning system 100 comprises a user device 102 that can be associated with a user of interest, such as a student, and is communicatively coupled using one or more telecommunication connections 110 and a network 120 to an application server computer 130. In an embodiment, the application server computer 130 is communicatively coupled to network 120 and to database 150, which can be programmed using a relational table schema to store a plurality of relational tables 152, 154. The user device 102 and application server computer 130 can interoperate to create, transmit, present, and receive response signals relating to digitally stored flashcards 104. Each of the flashcards 104 can be associated, in database table 152 of database 150, with digital data specifying a term 12, 14 that is associated with a term set 10, where each term 12, 14 is associated with a plurality of distractors 16, 18, 20.

In one embodiment, each flashcard 104 can comprise two sides of digitally stored text data, such as a word side text Qword, a definition side text Qdef, or both as a Qterm. Qterm can be a concatenation of a QWord and QDef to combine the word side text and the definition side text of the flashcard 104. For example, in an embodiment, under the control of a client-side e-learning application 103, the user device 102 can signal a choice of a flashcard 104 which includes a question as in a MCQ which can be characterized by a Qword, such as "What is a Nucleoid?", a Qdef, such as "in prokaryotes it is where the cell's DNA is stored but it is not an enclosed organelle", or a Qterm, such as "What is a Nucleoid? in prokaryotes it is where the cell's DNA is stored but it is not an enclosed organelle." Other embodiments can use a browser program at the user device 102 to programmatically interoperate with an e-learning web application 132 hosted at the application server computer 130. While the foregoing presents an example of an online, real-time interaction between the user device 102 and the application server computer 130, certain embodiments also use offline, back-end, or batch processing under the control of the application server computer to transform records of the database 150 without interaction with user device 102, as further described in other sections herein.

For purposes of illustrating a clear example, FIG. 1 shows a user device 102 and a flashcard 104 via a single logical connection 110, but other embodiments can use any number of user devices to create, read, and signal responses to flashcards and the present disclosure specifically contemplate executing with thousands to millions of flashcards 104, term sets 10, terms 12, 14, and distractors 16, 18, 20.

At application server computer 130, the e-learning web application 132 can comprise one or more sequences of stored program instructions that implement an HTTP server and business logic to execute e-learning functions such as creating student accounts, receiving data to specify schools and courses, determining one or more term sets 10 that are relevant to courses in which student accounts are enrolled, presenting terms 12, 14 and distractors 16, 18, 20, evaluating response signals, transmitting answers, and otherwise managing an e-learning process. The application server computer 130 further comprises, in one embodiment, an MCQ generator service 134, which can be implemented as sequences of stored instructions that are programmed to generate candidate distractors 16, 18, 20 for a particular term 12, 14, using a plurality of programmed algorithms and machine learning models. In some embodiments, the MCQ generator service 134 comprises a microservice that the e-learning web application 132 or other services or applications can call programmatically. Further, in an embodiment, the MCQ generator service 134 can be programmed to execute as an offline, back-end, or batch job to access or read many term sets 10 and terms 12, 14 successively, to execute the plurality of algorithms and evaluate the machine learning models in inference stages to generate candidate distractors 16, 18, 20 and digitally store the candidate distractors in one or more of the tables 152, 154, as further described.

In one embodiment, user device 102 may be a computer that includes hardware capable of communicatively coupling the device to the application server computer 130, over one or more service providers. For example, user device 102 may include a network card that communicates with application server computer 130, through a home or office wireless router (not illustrated in FIG. 1) that is communicatively coupled to an internet service provider. The user device 102 may be a smartphone, personal computer, tablet computing device, PDA, laptop computer, or any other computing device capable of transmitting and receiving information and performing the functions described herein.

In one embodiment, the user device 102 may comprise device memory, an operating system, one or more application programs such as client-side e-learning application 103 and/or a browser, and/or one or more application extensions. In one embodiment, user device 102 hosts and executes the client-side e-learning application 103, which the user device 102 may download and install from application server computer 130, an application store, or another repository. The client-side e-learning application 103 is compatible with e-learning web application 132 and may communicate using an app-specific protocol, parameterized HTTP POST and GET requests, and/or other programmatic calls. In some embodiments, client-side e-learning application 103 comprises a conventional internet browser application that can communicate over network 120 to other functional elements via HTTP and is capable of rendering dynamic or static HTML, XML, or other markup languages, including displaying text, images, accessing video windows and players, and so forth. In embodiments, application server computer 130 may provide an application extension for client-side e-learning application 103 through which the communication and other functionality may be implemented. In embodiments, a device display, such as a screen, may be coupled to the user device 102 to render a graphical user interface based on presentation instructions transmitted from the application server computer 130. For example, the client-side e-learning application 103 may be programmed to provide a text input in a query as a question in a flashcard for a user of interest in a learning mode. As another example, the client-side e-learning application 103 may be programmed to receive a text input in a query by a user from the device display running on the user device 102. The text input can include a word side of the question, such as a Qword, or a definition side of the question, such as a Qdef, or both. The client-side e-learning application 103 may be programmed to send the received text input from the user device 102 in a query via network 120 to the application server computer 130 as text data. For example, the text input may be any text string made up of one or more unigrams. As used herein, unigrams may be determined from words or groups of words, any part of speech, punctuation marks (e.g., "%"), colloquialisms (e.g., "move forward"), acronyms (e.g., "MCQ"), abbreviations (e.g., "ct."), exclamations ("ugh"), alphanumeric characters, symbols, written characters, accent marks, or any combination thereof. As another example, the text input may be an input Qword of "What is a Nucleoid?" which includes multiple unigrams, such as "What", "is", "a", "Nucleoid", and "?".

The application server computer 130 may be implemented using a server-class computer or other computer having one or more processor cores, co-processors, or other computers. The application server computer 130 may be a physical server computer and/or one or more virtual machine instances and/or virtual storage instances hosted or executed using in a private or public data center, such as through a cloud computing service or facility. In one embodiment, an application server computer may be implemented using two or more processor cores, clusters, or instances of physical machines or virtual machines, configured in a discrete location, or co-located with other elements in a datacenter, shared computing facility, or cloud computing facility.

Each of the functional components of the learning system 100 can be implemented as one or more sequences of stored program instructions stored in non-transitory computer-readable storage media, other software components, general or specific-purpose hardware components, firmware components, or any combination thereof. A storage component, such as database 150, can be implemented using any of relational databases, object databases, flat file systems, or JSON stores. A storage component like database 150 can be connected to the functional components locally or through the networks using programmatic calls, remote procedure call (RPC) facilities, or a messaging bus. A component may or may not be self-contained. Depending upon implementation-specific or other considerations, the components may be centralized or distributed functionally or physically.

2.2 MCQ Generator Service

Referring now to FIG. 2, in one embodiment, the MCQ generator service 134 is organized as one or more sequences of stored program instructions to implement a plurality of methods, objects, functions, or procedures including control instructions 201, a user-defined algorithm 202, an often-confused algorithm 204, a number replacement algorithm 206, a within-set generator 208, and cross-algorithm ranking instructions 212. In an embodiment, the within-set generator 208 comprises a trained within-set machine learning model 210, and the cross-algorithm ranking instructions 212 comprise a trained cross-algorithm ranking model 214.

Using database 150, content data can be digitally stored in the e-learning system 100 using terms (corresponding to one flashcard) and sets (corresponding to a collection of flashcards). Each term comprises a word side and a definition or answer side. Machine-implemented multiple-choice question (MCQ) processes are programmed, in general, to transform a term into a MCQ by pairing distractors with the definition or answer side. For example, assume that the term "mitosis" is digitally stored with the definition side "part of eukaryotic cell division during which the cell nucleus divides." Using the definition side as a prompt, an MCQ can be generated by pairing the term with distractors, such as:

Part of eukaryotic cell division during which the cell nucleus divides:
A. Mitosis; B. Meiosis; C. Cytokinesis; D. Binary fission For learners, practicing with MCQs is a good way to build familiarity with new knowledge. Embodiments can help students learn by transforming the flashcards that the students study into MCQs. However, only high-quality MCQs will maximize learning. Therefore, machine approaches are needed to optimize the generation of distractors that are relevant, yet not too obvious, to challenge students and maintain engagement in the learning process. Several approaches to machine generation of MCQs are possible.

ON-CLIENT STRING SIMILARITY. In this approach, to generate distractors for a term, a process is programmed to randomly select other terms from the same set as candidate distractors and choose the closest terms based on a weighted combination of edit distance, length distance, and data type (number or text). Such a process can be implemented using a mobile application or other client-side software, to generate MCQs in real time when a user studies a term.

DISTRACTOR GENERATION SERVICE WITH RULES. Another approach implements one version of a programmed distractor generation service as a server-based microservice comprising three algorithms to generate distractor candidates and a rule-based ranking method to rank and select the final distractors. In one embodiment of this approach, the algorithms comprise a user-defined algorithm, an often-confused algorithm, and a number replacement algorithm.

1. User-defined algorithm. One embodiment of MCQ generator service 134 can comprise a user-defined algorithm 202 (FIG. 2), the operation of which presumes that an e-learning system previously has digitally stored thousands to millions of terms created by users that are already in MCQ format, comprising an MCQ prompt and options stored in association with an answer. The user-defined algorithm 202 can establish a pipeline, such as an extract-transform-load (ETL) process, to parse MCQs periodically to obtain the user-defined answers and their distractors. The user-defined algorithm 202 can store the unique answers and their distractors with pairing frequency as weights in a Spanner table. For a new term, the user-defined algorithm 202 can be programmed to look up the term's answer in the Spanner table and return the top distractors if they exist in the table. Output of user-defined algorithm 202 comprises a first set of candidate distractors 232.

2. Often-confused algorithm. One embodiment of MCQ generator service 134 can comprise an often-confused algorithm 204 (FIG. 2), the operation of which presumes that the e-learning system has been programmed to log users' answers to system-generated MCQs and written questions. Log entries capture the MCQs and written questions together with values specifying whether the user selected the correct answer or a wrong answer; to facilitate logging, a user interface that presents questions and MCQs can be programmed to signal a logging process in response to receiving user input selecting an answer. The often-confused algorithm 204 can establish an ETL pipeline to aggregate the logging data periodically to obtain a set of unique answers and the wrong answers that users selected or wrote. The answer keys and their often-confused distractors can be stored, in association with values specifying a frequency of wrongly selected or written as weights, in a Spanner table. For a new term, often-confused algorithm 204 is programmed to look up the term's answer in the Spanner table and return the top distractors if they exist in the table. As one example, the terms "meiosis" and "mitosis" are commonly selected incorrectly in response to different questions in the field of biology. Output of often-confused algorithm 204 comprises a second set of candidate distractors 234.

3. Number replacement algorithm. One embodiment of MCQ generator service 134 can comprise a number replacement algorithm 206 (FIG. 2) for use when a number appears in the answer and the answer is short. In those cases, the number replacement algorithm 206 can be programmed to execute pseudo-random or truly random permutations of the number to generate distractors, with special boundaries for ordinal numbers, dates, ranges, and other circumstances. Output of number replacement algorithm 206 comprises a third set of candidate distractors 236. TABLE 1 shows examples of correct answers and distractors that can be generated using number replacement algorithm 206.

TABLE 1

NUMERIC CORRECT ANSWERS AND DISTRACTORS

| Correct answer | Distractors |
| --- | --- |
| 1350 | ['1351', '1349', '1450'] |
| 10-12 Months | ['11-16 Months', '20-40 Months', '9-10 Months'] |
| April 15 | ['April 20', 'April 5', 'April 16'] |
| 54th Massachusetts Regiment | ['57th Massachusetts Regiment', '52nd Massachusetts Regiment', '51st Massachusetts Regiment'] |

One version of a microservice can be programmed to generate distractors or an MCQ for a term by applying the three algorithms to generate top distractor candidates in the form of the first, second, and third sets of candidate distractors 232, 234, 236, then use a rule-based ranking method to choose the final distractors. The ranking method can be programmed to rank distractors based on manually defined algorithm preferences and other binary indicators such as whether the distractors are from the set, subject matching, or other factors.

2.3 Distractor Generation Service with within-Set Generator

In an embodiment, the MCQ generator service 134 (FIG. 1, FIG. 2) comprises, in addition to algorithms 202, 204, 206 as previously described, two machine learning models to generate and rank candidates as part of within-set generator 208 and cross-algorithm ranking instructions 210.

2.3.1 within-Set Generator

In an embodiment, within-set generator 208 comprises a within-set generator model 210, which can be programmed as a Random Forest model that is trained to choose distractors for a term from the same set. In an embodiment, the Random Forest implementation of the open-source library "scikit-learn" can be used. The within-set generator model 210 can be programmed to offer distinct improvements over the string similarity process described above, and preferably is implemented in the distractor service of the server computer, rather than in the client computer. This architecture enables the choices that the within-set generator model 210 generates to be ranked against the other algorithms 202, 204, 206 of the present disclosure to improve the quality of a set of final or best distractors 220.

In one experimental implementation, the within-set generator model 210 was trained on answer logging data as follows. Labels for answer logging data were created by aggregating terms that have distractors from terms in the same set—that is, within-set distractors generated by the ON-CLIENT STRING SIMILARITY approach described in a preceding section—and that have been answered by users. All the terms and their "distractor" terms can be paired, and the label for the pair is set to "1" if the distractor was selected by a threshold number of users and otherwise is set to "0." In some embodiments, the threshold number of users is from two to five.

In the experimental implementation, the features of the within-set generator model 210 comprised:

The subject of the set. Examples include Science, Social Science, Arts and Humanities.

Term features that are various distances between the target term and candidate term for both the prompt side and the answer side. Examples include embedding similarity, edit distance, token similarity, part of speech match, length distance, whether containing numbers, prefix match, and suffix match.

Furthermore, in the experimental implementation, the training labels were generated using option selection statistics to generate labels that avoid labor-intensive manual labeling processes and ensure higher quality negative labels than the mere use of random pairing. The option selection statistics can be the number of users who selected the distractor when answering the MCQs that contain it. Thus, if more than a specified threshold number of users chose the distractor, then the label "1" can be used to indicate a good distractor, whereas the label "0" can indicate a bad distractor.

In an embodiment, the within-set generator 208 is programmed to pair the term with all the other terms from the same term set 10, conduct feature processing and model inferences by the within-set machine learning model 210, then rank the candidate terms by the propensity scores. The terms having the Nhighest score values are selected as the distractors and output as an interim set of candidate set of distractors to the cross-algorithm ranking instructions 212. In various embodiments, N can range from "1" to "5" or more. Output of within-set generator 208 comprises a fourth set of candidate distractors 238.

2.3.2 Cross-Algorithm Ranking Mode

In an embodiment, the cross-algorithm ranking instructions 212 comprise a cross-algorithm ranking model 214 that is implemented as a second Random Forest model that is trained to classify or choose the best distractors across multiple algorithms. Input comprises the first, second, third, and fourth sets of candidate distractors 232, 234, 236, 238, each of which is labeled or tagged with an identifier of the corresponding algorithm 202, 204, 206 or generator 208 that produced it. In the experimental implementation, the cross-algorithm ranking model 214 was trained using manually labeled data. The experimental implementation included generating distractors for pseudo-randomly selected terms using the microservice approach previously described above, resulting in about 6,000 pairs of terms and distractors. All such pairs were manually reviewed and labeled with "1" or "0" to indicate whether the distractor appeared good for the term. Model features included:

An identifier of the subject of the set; the examples above apply to the present model.

An identifier of the algorithm 202, 204, 206, or generator 208 that generated the distractor and the algorithm score.

Whether the distractor was from the same set.

Term features included various distances between target term and distractor candidates, such as embedding similarity, edit distance, token similarity, part of speech match, length distance, whether containing numbers, prefix match, and suffix match.

In an embodiment, MCQ generator service 134 is programmed to base its answer on applying the four algorithms that have been previously described—namely the user-defined algorithm 202, often-confused algorithm 204, number replacement algorithm 206, and within-set generator 208—to generate a plurality of interim sets 232, 234, 236, 238 of top N or distractor candidates and then use the cross-algorithm ranking instructions to conduct feature processing, model inference with cross-algorithm ranking model 214 and ranking to choose a set of best distractors 220.

2.4 Procedural Overview

Figure 3:
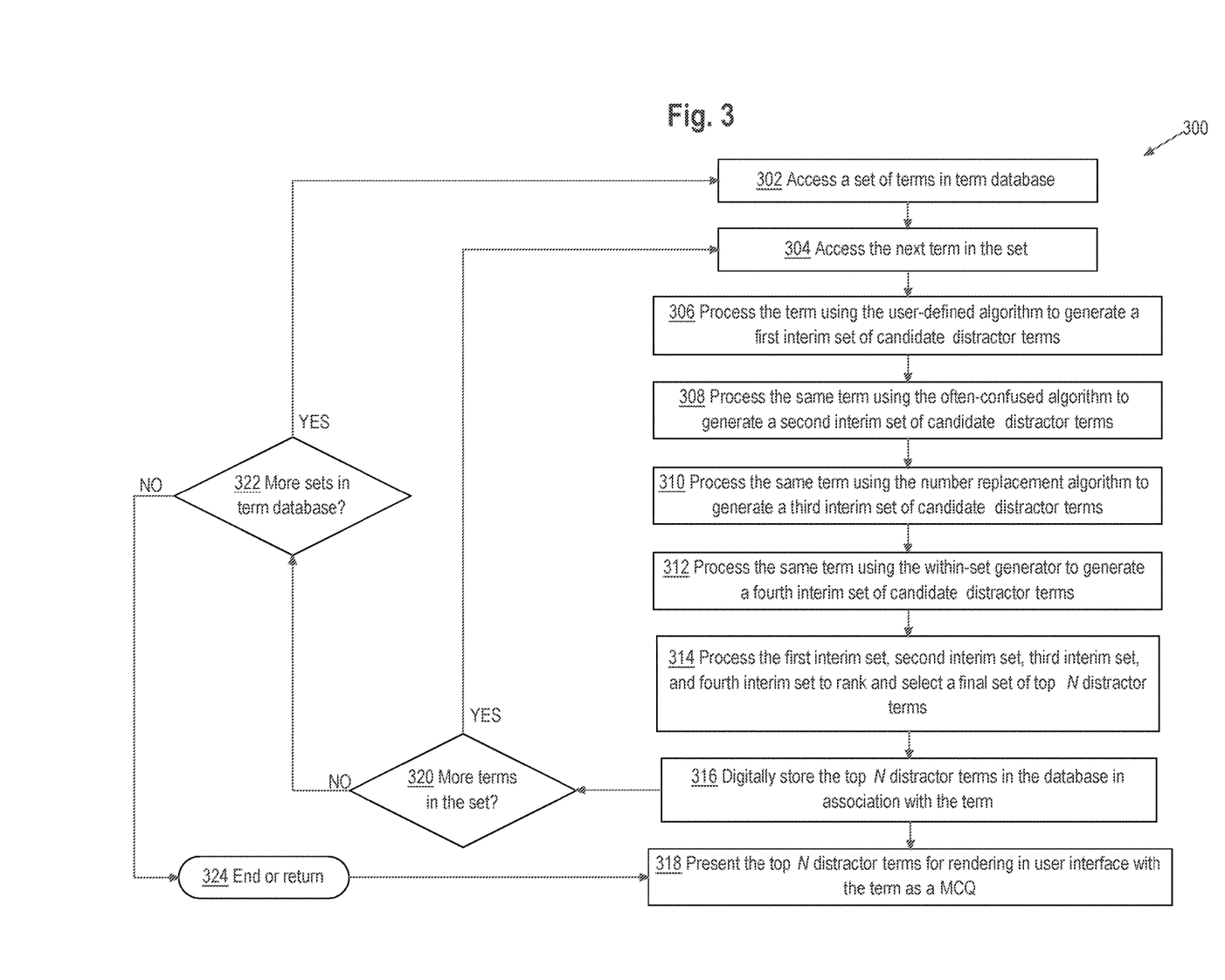
FIG. 3 illustrates an example computer-implemented process that can be programmed to implement an embodiment of the MCQ generator service of FIG. 1.

FIG. 3 illustrates an example computer-implemented process that can be programmed to implement an embodiment of the MCQ generator service 134 of FIG. 1, FIG. 2, using one or more sequences of instructions. While the various blocks in FIG. 3 are presented and described sequentially, some or all the blocks may be executed in different orders, may be combined or omitted, and some or all the blocks may be executed in parallel. Furthermore, the blocks may be performed actively or passively. FIG. 3 and each other flow diagram herein is intended as an illustration at the functional level at which skilled persons, in the art to which this disclosure pertains, communicate with one another to describe and implement algorithms using programming. The flow diagrams are not intended to illustrate every instruction, method object or sub-step that would be needed to program every aspect of a working program, but are provided at the same functional level of illustration that is normally used at the high level of skill in this art to communicate the basis of developing working programs.

At block 302, a process 300 is programmed to access a set of terms in a term database. For example, application server computer 300 can query table 152 of database 150 under control of the MCQ generator service 134 and receive, in a result set, a plurality of sets of terms 10, or a successive or next term set that has not been processed previously. At block 304, the process 304 accesses the next term in the set under consideration from the result set. With the tests of blocks 320, 322, process 300 presents an iterative method of accessing all term sets and all terms in the database 150. Such an iterative, comprehensive implementation could be implemented as a cron job, scheduled job, batch process or other offline, back-end service, for example, on a nightly basis to generate candidate distractors for all new terms or term sets that students or administrators created in database 150 in the preceding day. Alternatively, process 300 can be implemented using on-demand or selective techniques in which user input specifies one or more term sets or terms to process.

At block 306, the process 300 is programmed to process the term using the user-defined algorithm to generate a first interim set of candidate distractor terms. In an embodiment, block 306 comprises programmatically calling or invoking the user-defined algorithm 202 to produce the first interim set of candidate distractors 232 in the manner previously described for FIG. 2.

At block 308, the process 300 is programmed to process the same term using the often-confused algorithm to generate a second interim set of candidate distractor terms. In an embodiment, block 308 comprises programmatically calling or invoking the often-confused algorithm 204 to produce the second interim set of candidate distractors 234 in the manner previously described for FIG. 2.

At block 310, the process 300 is programmed to process the same term using the number replacement algorithm to generate a third interim set of candidate distractor terms. In an embodiment, block 310 comprises programmatically calling or invoking the number replacement algorithm 206 to produce the third interim set of candidate distractors 236 in the manner previously described for FIG. 2.

At block 312, the process 300 is programmed to process the same term using the within-set generator to generate a fourth interim set of candidate distractor terms. In an embodiment, block 312 comprises programmatically calling or invoking the within-set generator 208 and its within-set machine learning model 210 to produce the fourth interim set of candidate distractors 238 in the manner previously described for FIG. 2.

In one embodiment, process 300 is programmed to execute blocks 306, 308, 310, 312 sequentially in the flow shown in FIG. 3. In another embodiment, process 300 is programmed to call or invoke blocks 306, 308, 310, 312 in parallel using one or more parallel execution threads, and block 314 is configured to wait on the completion of all the threads for block 306, 308, 310, 312 before executing.

At block 314, process 300 is programmed to process the first interim set, second interim set, third interim set, and fourth interim set to rank and select a final set of top N distractor terms. In an embodiment, block 314 comprises programmatically calling or invoking the cross-algorithm ranking instructions 212 and cross-algorithm ranking model 214 to produce the best distractors 220 in the manner previously described in relation to FIG. 2.

At block 316, process 300 is programmed to digitally store the top N distractor terms in the database in association with the term. For example, best distractors 220 can be stored in table 154 of database 150, with pointers, references, or other links to a row of table 152 that stores the term that was evaluated. Additionally, at block 318, process 300 can be programmed to present the top N distractor terms for rendering in a user interface with the term as part of displaying a multiple-choice question, based on the term, and a plurality of possible answers, comprising the top N distractor terms. In this manner, the process of FIG. 3 and the structure of FIG. 1, FIG. 2 address the practical problem of how to present useful and effective multiple-choice questions to user computers of learners, without time-consuming, manual selection of possible answers and/or candidate distractors.

After block 316, in addition to block 318, at block 320 the process 300 is programmed to test whether more terms are present in the database 150. If so, then control transfers to block 304 to repeat accessing the next term in the set and iterate again through block 306, block 308, block 310, block 312, block 314, block 316. If the test of block 320 is negative, then control transfers to block 322, in which the process is programmed to test whether more sets are present in the database 150. If so, then control transfers to block 302 to repeat accessing the next set of terms, followed by the first term in the set at block 304, and to iterate again through block 306, block 308, block 310, block 312, block 314, block 316.

If the test of block 322 is negative, then control transfers to block 324 at which the process 300 is programmed to end or return control to another application or process that called the process. Or control can transfer to block 318 to present the top N distractor terms for rendering in user interface with the term as a MCQ, as previously described. Thus, the presentation of a MCQ and distractors can be deferred until after all term sets and all terms have been processed, or presentation can occur whenever a particular term has been processed. Furthermore, the presentation at block 318 can be programmed as an operation that is asynchronous with respect to the rest of the process 300. Thus, the process 300 can be used to generate an updated database 150 of candidate distractors for all available term sets and terms, and block 318 can be used as a discrete operation of the e-learning web application 132 and/or client-side e-learning application 103 to present a particular MCQ at a particular time. Using all these alternatives, the process of 300 is integrated into a solution to the practical problem of how to present useful and effective multiple-choice questions to user computers of learners, without time-consuming, manual selection of possible answers and/or candidate distractors.

Moreover, experimentation with an implementation resulted in considerably improved quality. As examples, the following combinations of prompts, answers, and distractors can be compared as shown in TABLE 2 for the approaches of section 2.2 and section 2.3 of this disclosure.

TABLE 2

COMPARATIVE IMPROVEMENT IN DISTRACTORS

| Prompt | Answer | Distractors Generated Using Approach of Section 2.2 | Improved Distractors Generated Using Approach of Section 2.3 |
|---|---|---|---|
| * 20th president of the U.S. * Republican * Key Issues: Civil service reform, Chinese immigration | James A. Garfield (1881) | James A. Garfield (1891) James A. Garfield (1880) James A. Garfield (1876) | Chester A. Arthur (1881-1885) James Buchanan (1857-1861) *Plessy* v. *Ferguson* (1896) |
| 1800s manufacturing center of the U.S. in the northeast. Diversified economy focused on factory production, increase of population and lack of slave labor system. | Industrial North | unskilled workers mass production bleeding kansas | wilderness north Agricultural South agriculture middle |
| (adj.) flowing sweetly or smoothly, honeyed Syn: euphonious, musical Ant: shrill, strident, harsh, grating | mellifluous | peccadillo happy notes | superfluous cantankerous peccadillo |

3. Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 4:
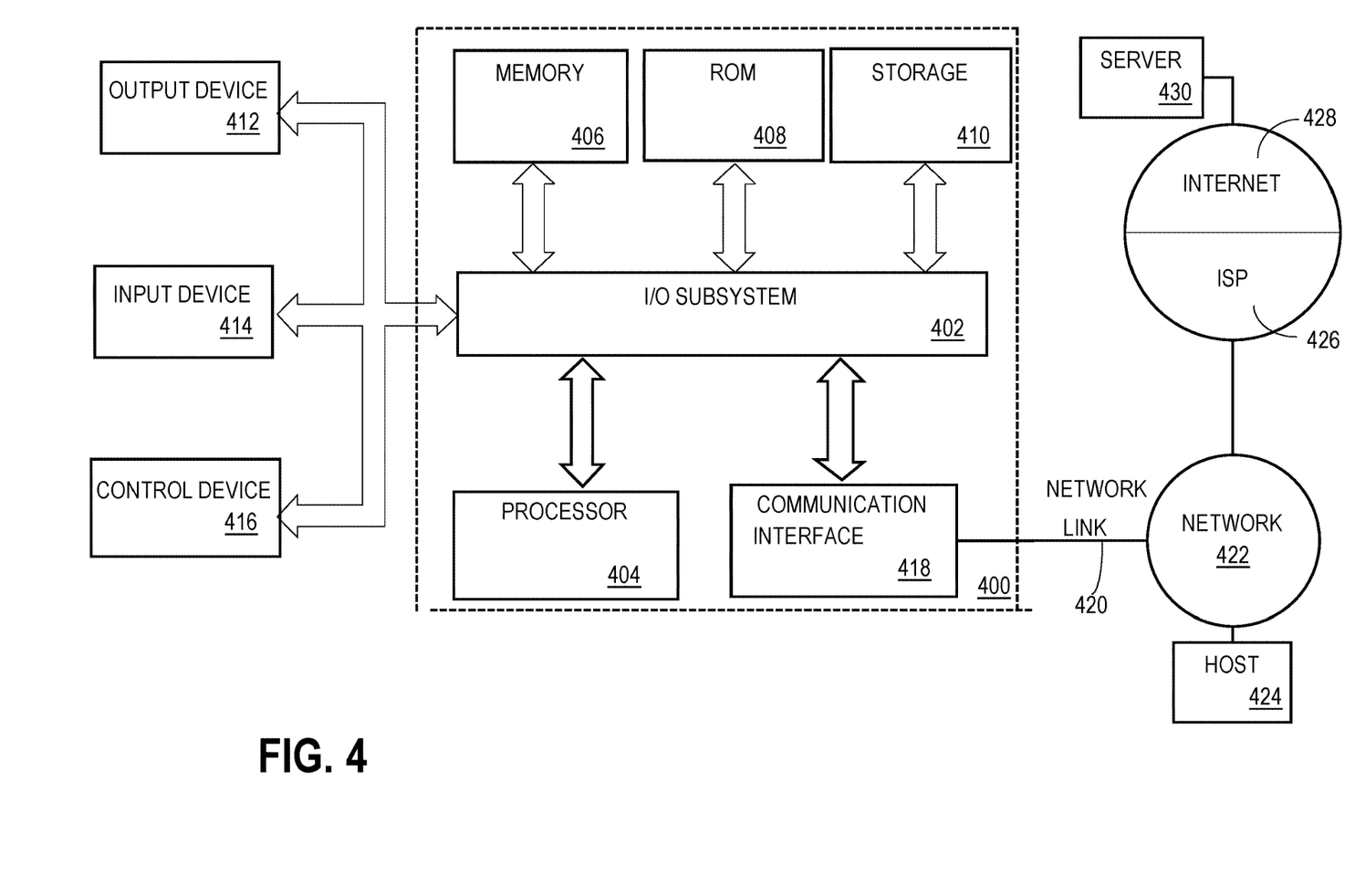
FIG. 4 illustrates a computer system with which the user device and/or application server computer could be implemented, in various embodiments.

FIG. 4 is a block diagram that illustrates an example computer system with which an embodiment may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output device 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed, and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
 using an application server computer that is communicatively coupled to a database via a telecommunication network, the database comprising a digitally stored relational table schema storing a plurality of term sets, each of the term sets comprising a plurality of terms, the application server computer hosting an application program programmed with a plurality of distractor selection algorithms;
 using the application server computer, obtaining labeled answer logging data from a plurality of answer signals received from a plurality of client computers based on answers to prior questions electronically presented by the plurality of client computers;
 using the application server computer, executing each of the distractor algorithms to access a particular term from among the plurality of the terms as an input and to generate a plurality of corresponding first interim sets of candidate distractor terms, for the particular term, as an output;
 using the application server computer, executing a training stage of a within-set machine learning model over a first training dataset of the labeled answer logging data;
 using the application server computer, executing a first inference stage of the within-set machine learning model over the same particular term as input to generate classification output comprising a second interim set of candidate distractor terms, for the particular term;
 using the application server computer, executing a second inference stage of a cross-algorithm ranking machine learning model over the plurality of corresponding first interim sets and the second interim set to generate a top-N set of best candidate distractors;
 using the application server computer, digitally storing the top-N set of best candidate distractors in a table of the relational table schema in association with the particular term;
 using the application server computer, formatting the top-N set of best candidate distractors with the particular term as a multiple-choice question set and transmitting, to an additional client computer, presentation instructions which when rendered using the additional client computer cause presenting a user interface comprising the particular term as a prompt and the top-N set of best candidate distractors as available answers.

2. The computer-implemented method of claim 1, further comprising, using the application server computer, repeating the steps of executing and the step of digitally storing for the plurality of terms of each of the term sets as part of an offline process.

3. The computer-implemented method of claim 1, wherein the plurality of distractor selection algorithms comprises a user-defined algorithm, an often-confused algorithm, and a number replacement algorithm; wherein the plurality of corresponding first interim sets of candidate distractor terms comprises a first interim set of candidate distractor terms, a second interim set of candidate distractor terms, and a third interim set of candidate distractor terms; the method further comprising:
  processing the particular term using the user-defined algorithm to generate a first interim set of candidate distractor terms;
  processing the particular term using the often-confused algorithm to generate a second interim set of candidate distractor terms;
  processing the particular term using the number replacement algorithm to generate a third interim set of candidate distractor terms.

4. The computer-implemented method of claim 1, wherein the first training dataset of labeled answer logging data is generated by aggregating terms from the second interim set of candidate distractor terms.

5. The computer-implemented method of claim 4, the first training dataset comprising a plurality of records each having columns, attributes, or features corresponding to a subject of a set and a plurality of distance values for distances between the particular term and a candidate distractor term.

6. The computer-implemented method of claim 5, the plurality of distance values further comprising values for embedding similarity, edit distance, token similarity, part of speech match, length distance, whether contain numbers, prefix match, suffix match.

7. The computer-implemented method of claim 1, wherein the cross-algorithm ranking machine learning model comprises a second random forest model that has been trained on a second training dataset of labeled pairs of previous terms and previous distractors, the second training dataset comprising a plurality of records each having columns, attributes, or features corresponding to: a subject of a set; an identifier of an algorithm that generated the previous distractors; and a plurality of distance values for distances between the particular term and a candidate distractor term.

8. The computer-implemented method of claim 7, the plurality of distance values further comprising values for embedding similarity, edit distance, token similarity, part of speech match, length distance, whether contain numbers, prefix match, suffix match.

9. The computer-implemented method of claim 1, each of the term sets corresponding to an educational subject in an e-learning system, each of the terms in the plurality of terms comprising a digitally stored prompt of a multiple-choice question associated with the educational subject, each of the candidate distractors comprising available multiple-choice answers to the multiple-choice question.

10. One or more non-transitory computer-readable storage media storing one or more sequences of instructions which, when executed using one or more processors, cause the one or more processors to execute:
  using an application server computer that is communicatively coupled to a database via a telecommunication network, the database comprising a digitally stored relational table schema storing a plurality of term sets, each of the term sets comprising a plurality of terms, the application server computer hosting an application program programmed with a plurality of distractor selection algorithms;
  using the application server computer, obtaining labeled answer logging data from a plurality of answer signals received from a plurality of client computers based on answers to prior questions electronically presented by the plurality of client computers;
  using the application server computer, executing each of the distractor algorithms to access a particular term from among the plurality of the terms as an input and to generate a plurality of corresponding first interim sets of candidate distractor terms, for the particular term, as an output;
  using the application server computer, executing a first inference stage of a within-set machine learning model over the same particular term as input to generate classification output comprising a second interim set of candidate distractor terms, for the particular term;
  using the application server computer, executing a training stage of a random forest within-set machine learning model over a first training dataset of labeled answer logging data;
  using the application server computer, executing a second inference stage of a cross-algorithm ranking machine learning model over the plurality of corresponding first interim sets and the second interim set to generate a top-N set of best candidate distractors;
  using the application server computer, digitally storing the top-N set of best candidate distractors in a table of the relational table schema in association with the particular term;
  using the application server computer, formatting the top-N set of best candidate distractors with the particular term as a multiple-choice question set and transmitting, to an additional client computer, presentation instructions which when rendered using the additional client computer cause presenting a user interface comprising the particular term as a prompt and the top-N set of best candidate distractors as available answers.

11. The non-transitory computer-readable storage media of claim 10, further comprising, using the application server computer, repeating the operations of executing and the operation of digitally storing for the plurality of terms of each of the term sets as part of an offline process.

12. The non-transitory computer-readable storage media of claim 10, wherein the plurality of distractor selection algorithms comprises a user-defined algorithm, an often-confused algorithm, and a number replacement algorithm; wherein the plurality of corresponding first interim sets of candidate distractor terms comprises a first interim set of candidate distractor terms, a second interim set of candidate distractor terms, and a third interim set of candidate distractor terms; further comprising sequences of instructions which when executed using the one or more processors cause the one or more processors to execute:

processing the particular term using the user-defined algorithm to generate a first interim set of candidate distractor terms;

processing the particular term using the often-confused algorithm to generate a second interim set of candidate distractor terms;

processing the particular term using the number replacement algorithm to generate a third interim set of candidate distractor terms.

13. The non-transitory computer-readable storage media of claim 10, wherein the first training dataset of labeled answer logging data is generated by aggregating terms from the second interim set of candidate distractor terms.

14. The non-transitory computer-readable storage media of claim 13, the first training dataset comprising a plurality of records each having columns, attributes, or features corresponding to a subject of a set and a plurality of distance values for distances between the particular term and a candidate distractor term.

15. The non-transitory computer-readable storage media of claim 14, the plurality of distance values further comprising values for embedding similarity, edit distance, token similarity, part of speech match, length distance, whether contain numbers, prefix match, suffix match.

16. The non-transitory computer-readable storage media of claim 10, wherein the cross-algorithm ranking machine learning model comprises a second random forest model that has been trained on a second training dataset of labeled pairs of previous terms and previous distractors, the second training dataset comprising a plurality of records each having columns, attributes, or features corresponding to: a subject of a set; an identifier of an algorithm that generated the previous distractors; and a plurality of distance values for distances between the particular term and a candidate distractor term.

17. The non-transitory computer-readable storage media of claim 16, the plurality of distance values further comprising values for embedding similarity, edit distance, token similarity, part of speech match, length distance, whether contain numbers, prefix match, suffix match.

18. The non-transitory computer-readable storage media of claim 10, each of the term sets corresponding to an educational subject in an e-learning system, each of the terms in the plurality of terms comprising a digitally stored prompt of a multiple-choice question associated with the educational subject, each of the candidate distractors comprising available multiple-choice answers to the multiple-choice question.

* * * * *